United States Patent [19]

Schmitz

[11] Patent Number: 4,768,275
[45] Date of Patent: Sep. 6, 1988

[54] METHOD OF JOINING PIPE

[75] Inventor: Thomas R. Schmitz, Katy, Tex.

[73] Assignee: Cameron Iron Works, Inc., Houston, Tex.

[21] Appl. No.: 924,974

[22] Filed: Oct. 30, 1986

Related U.S. Application Data

[60] Division of Ser. No. 649,124, Sep. 10, 1984, Pat. No. 4,662,663, which is a continuation-in-part of Ser. No. 562,479, Dec. 19, 1983, abandoned.

[51] Int. Cl.⁴ .......................................... B23Q 17/00
[52] U.S. Cl. ...................................... 29/407; 29/237; 29/507; 29/523; 29/421.1; 405/169
[58] Field of Search ................. 29/407, 237, 507, 523, 29/421 R; 285/382.5; 277/26; 405/169, 154

[56] References Cited

U.S. PATENT DOCUMENTS

| | | | |
|---|---|---|---|
| 605,195 | 6/1898 | Bertwisle | 29/421 R UX |
| 861,127 | 7/1907 | Kleckner | 277/226 X |
| 2,438,529 | 3/1948 | Woodling | 285/382.5 X |
| 2,477,676 | 8/1949 | Woodling | 285/382.5 X |
| 2,831,711 | 4/1958 | Leadbetter | 285/382 X |
| 3,002,269 | 10/1961 | Hopkins | 29/421 R UX |
| 3,359,624 | 12/1967 | Cours et al. | 29/523 X |
| 3,712,631 | 1/1973 | Forchini et al. | 277/226 X |
| 3,980,311 | 9/1976 | Ditcher | 277/226 |
| 4,065,846 | 1/1978 | Leonard, Jr. | 29/407 |
| 4,330,144 | 5/1982 | Ridenour | 285/382.5 |

Primary Examiner—Charlie T. Moon
Attorney, Agent, or Firm—Vinson & Elkins

[57] ABSTRACT

An apparatus for joining two tubular members together at a subsea location wherein one of the tubular members has internal grooves and the second tubular member is sufficiently small to slide into the first tubular member and the first tubular member has an external flange suitable for connecting to a flowline, which apparatus includes a tubular mandrel having means for connecting to said first tubular member, a resilient sleeve surrounding said mandrel and adapted to be positioned within said second tubular member, volume compensating means positioned within each of said grooves and testing means carried by said mandrel to allow testing of the joint while the mandrel is still in position after forming. A method of joining tubular members at a subsea location including the steps of inserting the second tubular member within the first tubular member after the volume compensators have been inserted in the internal grooves in the first member, exerting fluid pressure on the interior of the second tubular to form the second tubular member against the internal grooves of the first tubular member and testing the formed joint while the mandrel is still in position within said second tubular member.

A second form of the invention includes the use of microspheres in an epoxy matrix positioned in internal grooves of the bell which are designed to collapse at pressures above the water pressure at the depth of the installation of the joint and at a pressure below the pressures which develop in trapped sea water in the groove during forming.

4 Claims, 10 Drawing Sheets

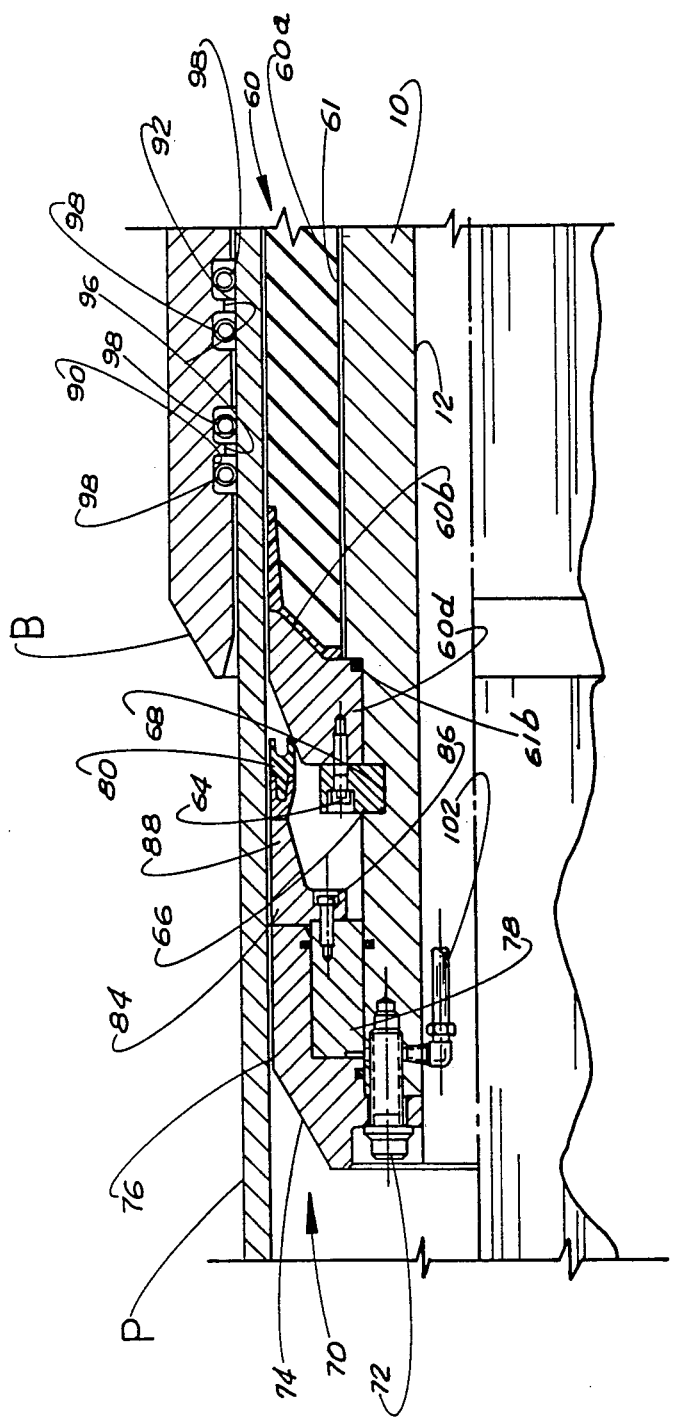

METHOD OF JOINING PIPE

CROSS REFERENCE TO RELATED APPLICATION

The present application is a division of my prior co-pending application Ser. No. 649,124 filed Sept. 10, 1984, now U.S. Pat. No. 4,662,663, which was a continuation-in-part of my prior application Ser. No. 562,479 filed Dec. 19, 1983, now abandoned.

BACKGROUND

A very considerable amount of work has been done in the past to join tubular members in subsea locations. One type of method which is believed to be particularly advantageous for joining tubular members underwater is to provide a ball joint having external connecting means and a bell member with a grooved inside diameter which fits closely about a pipe end to be joined thereto. A device is provided within the joint which can be positioned with an expansion sleeve within the pipe end so that when hydraulic pressure is applied to the expansion sleeve, it expands the pipe end into the internal grooves in the bell member to provide sealed joint with means for connecting to another pipe.

One particular disadvantage of these prior art devices is that there must be bleed ports or vents through the bell portion to vent the water trapped in the grooves when the pipe end is deformed into the grooves.

Another problem with the prior art devices is the lack of a means to pressure test the joint while the expansion sleeve is still in position to determine if it is necessary to exert further expansion pressure on the pipe end to complete any incomplete deformation.

An example of this type of prior art device is shown in the March, 1983 issue of Offshore Engineer wherein the expansion sleeve is expanded responsive to axial compression of the resilient sleeve within the deformable pipe end of the joint so that it is expanded into the grooves within the bell.

Another example of joint forming is shown in U.S. Pat. No. 4,183,555 in which rollers are forced laterally outward and rotated within a pin end to expand it against the interior of the bell.

SUMMARY

The present invention relates to an improved method and apparatus for joining pipe at a subsea location. The method includes the steps of releasably securing forming apparatus to a bell, inserting the pin end of the pipe to be joined into the bell with the forming apparatus positioned in the pipe, pressurizing the forming apparatus to deform the pin into internal grooves in the bell while avoiding pressure buildup within the grooves without leaving the grooves open to fluids surrounding the exterior of the bell and thereafter pressurizing the joint to verify the seal of the pin end of the pipe against the interior of the bell. The improved apparatus of the present invention includes a mandrel having a resilient sleeve, means for supplying pressure fluid to the interior of the resilient sleeve, means for connecting the mandrel to a bell with the bell in surrounding relationship to the resilient sleeve and spaced therefrom a sufficient distance radially to receive the pin end of a pipe therebetween, means for sealing within the pipe at the outer end of the mandrel and means for subjecting the joint between the pipe and the bell to fluid under pressure to verify the integrity of the joint. In a modified form of the present invention separate portions of the pipe joint are provided for the gripping and sealing functions. A further modification is the provision of microspheres in an epoxy matrix to provide the volume compensation means for the trapped water. The microspheres are designed to collapse at a pressure greater than the sea water depth pressure and at a pressure less than the forming pressure.

An object of the present invention is to provide an improved method and apparatus for joining pipe in subsea locations which forms a pressure tight joint without having vents extending through the bell into the internal grooves in the bell.

Another object is to provide an improved method and apparatus for testing a joint which is formed at a subsea location while the forming apparatus is still in position to allow the applicatin of additional forming force.

Still another object is to provide an improved method and apparatus of joining a bell member onto the end of a subsea pipeline which has been damaged, so that the pipeline may be quickly and simply rejoined.

DESCRIPTION OF THE DRAWINGS

These and other objects and advantages of the present invention are hereinafter set forth and explained with reference to the drawings wherein:

FIGS. 2a and 2b are partial sectional views of the ends of the improved apparatus of the present invention installed on the pin end of a with FIG. 2a illustrating the right hand portion of the apparatus and FIG. 2b illustrating the left hand portion of the apparatus.

DESCRIPTION OF THE PREFERRED EMBODIMENTS

Figure 1:
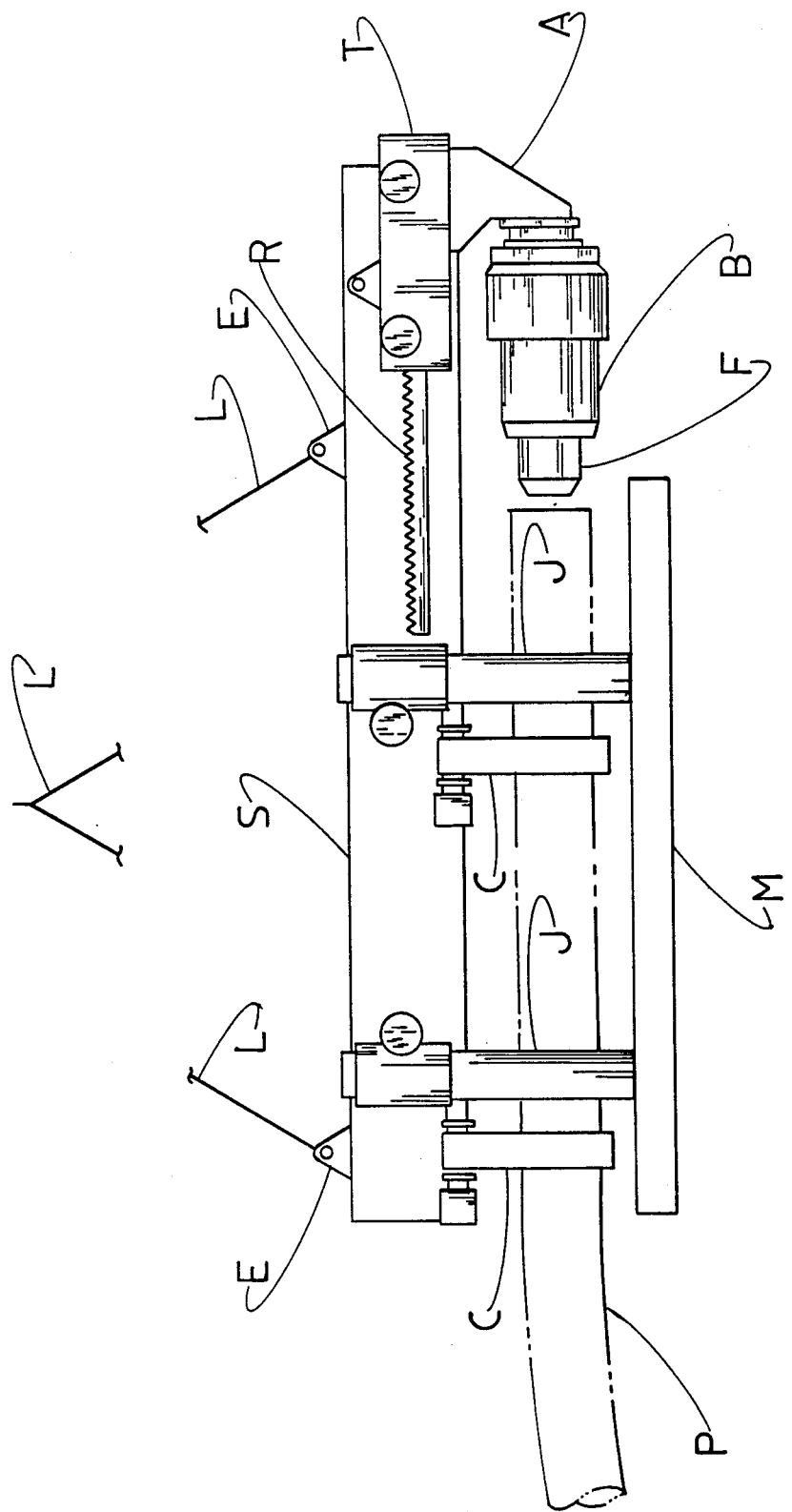
FIG. 1 is an elevation view showing the improved apparatus ready for installation on the pin end of a pipeline.
Figure 2A:
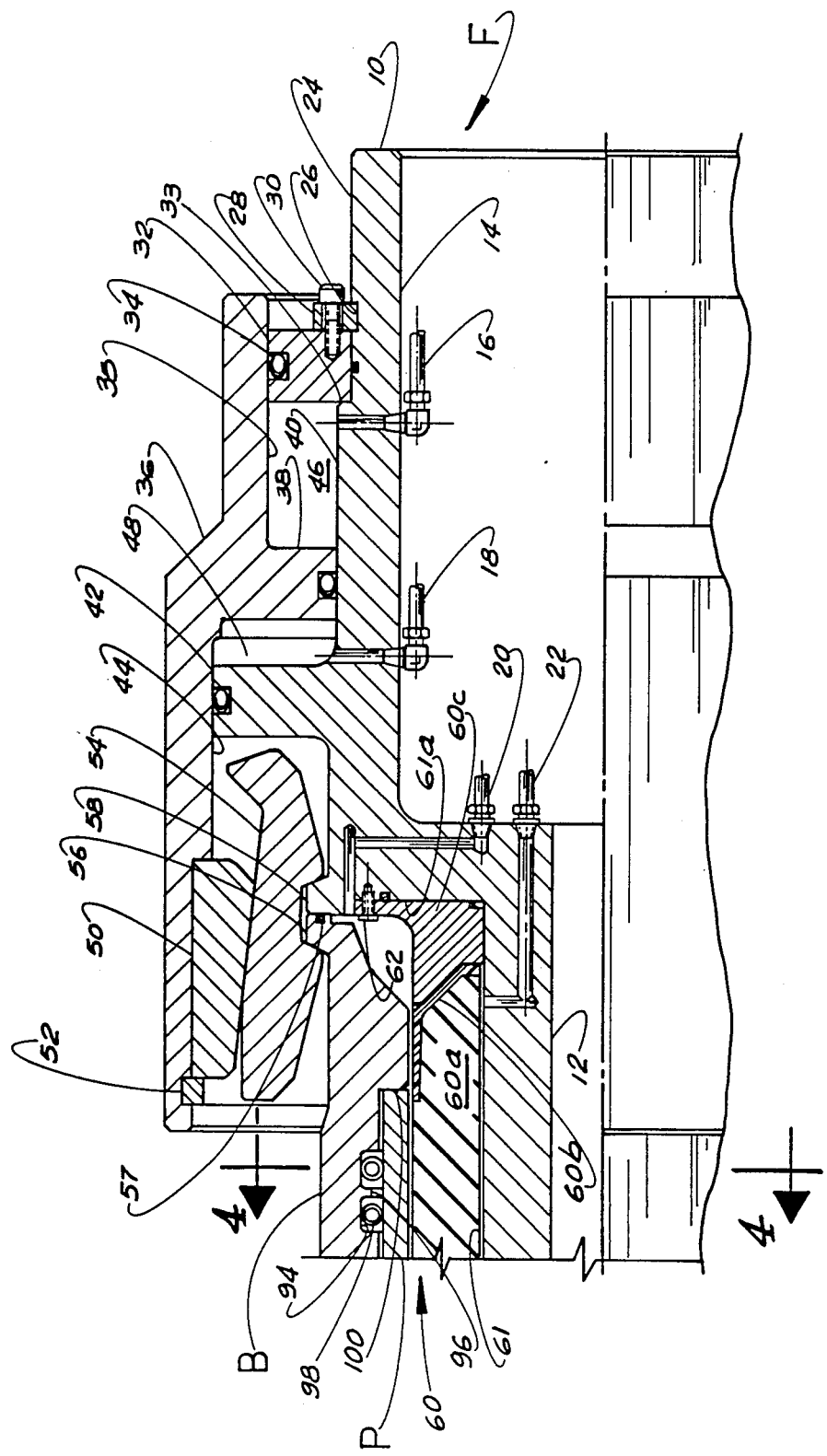

As shown in FIG. 1 the improved forming and testing apparatus of the present invention is shown in position at the pin end of pipeline P on which bell B is to be installed. The apparatus is shown as it would be used in a subsea location with the pipeline P being supported by swing type clamps C mounted on strongback S. Liftline L is connected to the eyes E on strongback S and extends to the surface or to some other suitable lifting control. The method of the present invention may be performed by remote control in deep water or by divers in shallow water. Forging tool F together with bell B are supported by arm A on trolley T which is mounted on guide rail R for movement axially of pipeline P. Mats M are positioned at each side of pipeline P and jack-up legs J are used to raise the open end of pipeline P above the sea bottom. Initially strongback S with legs J thereon is lowered into position to straddle the pin end of pipeline P which is to be provided with a new bell B. With mats M on each side of pipeline P, clamps C are rotated into engagement with pipeline P and then pipeline P is raised by jack-up legs J. If the end of pipeline P has been damaged a suitable tool (not shown) is lowered to engage guiderail R to cut the damaged end or otherwise prepare the pin end of pipeline P for the forming step of the present ivention. When the pin end is prepared, the tool is recovered and trolley T is lowered into position as shown in FIG. 1.

Improved forging tool F is shown in greater detail in FIGS. 2 through 5. Tool F includes tubular mandrel 10 having bore 12 extending therethrough and counterbore 14 open to be engaged by arm A (not shown in FIGS. 2 through 5) and to allow suitable hydraulic lines 16, 18, 20 and 22 to extend therein. The exterior surface 24 of mandrel 10 includes groove 26 into which segments 28 engage and segments 28 are bolted by bolts 30 to retain ring 32 in position on surface 24 against shoulder 33. Ring 32 includes outer seal ring 34 engaging the interior surface 35 of piston sleeve 36 which extends from inwardly extending flange 38 beyond ring 32 as shown. Flange 38 sealingly engages surface 40 on the exterior of mandrel 10. Flange 42 extends outward from mandrel 10 and seals against the interior surface 44 of sleeve 36. Chambers 46 and 48 are formed on opposite sides of flange 38 for the movement of piston sleeve 36 responsive to hydraulic fluid delivered through lines 16 and 18 to chambers 46 and 48, respectively. Cam ring 50 is secured to the interior of sleeve 36 by split ring 52. Cam ring 50 coacts with locking segments 54 to connect and disconnect mandrel 10 and bell B. This connection is made by engagement of locking segments 54 with flanges 56 and 58 on the exterior of bell B and mandrel 10. This collet type of connector provides a releasable remotely controlled connection of bell B to mandrel 10.

Resilient forming sleeve assembly 60 includes resilient sleeve 60a having end elements 60b and end rings 60c and 60d. Assembly 60 surrounds surface 61 on mandrel 10 and end rings 60c and 60d are suitable sealed to mandrel 10 so that hydraulic fluid delivered to the interior of resilient sleeve 60a through hydraulic line 22 is contained between sleeve 60a and surface 61. End ring 60c is secured to shoulder 61a on mandrel 10 by screws 62. End ring 60d abuts shoulder 61b on mandrel 10 and is held in position by segments 66 in groove 68. Segments 66 are secured to end ring 60d by bolts 64.

Test seal assembly 70 is secured to the end of mandrel 10 by bolts 72 extending through ring 74. Ring 74 includes sleeve 76 which is spaced outward from the exterior of mandrel 10 and extends toward end ring 60d. Annular piston 78 is positioned between sleeve 76 and mandrel 10 as shown and, when actuated, moves toward resilient sleeve assembly 60 to compress seal ring 80 between end ring 60d and the interior surface of pipeline P. Test seal assembly 70 includes ring 84 which is secured to the end of piston 78 by screws 86 and ring 84 has outer sleeve 88 which engages seal ring 80.

Figure 4:
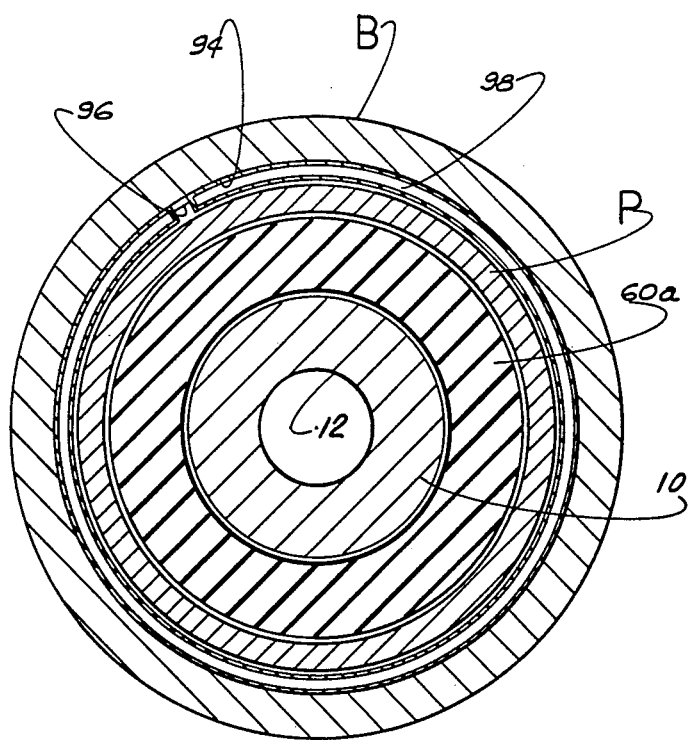
FIG. 4 is a sectional view taken along line 4—4 in FIG. 2a to show a volume compensation ring positioned in the internal bell member grooves.

Bell B is specially prepared with interior multiple grooves 90, 92 and 94 each of which s a double groove having short inwardly extending central lip 96. Volume compensating rings 98 are positioned in each groove. Rings 98 are illustrated in FIG. 4 and each is a split ring which is a gasfilled hollow metal tube extending substantially around the interior of its groove. The ends of the tube are sealed as shown and the ring is of a size to occupy a substantial portion of the volume of the gorrve in which it is positioned.

Figure 3A:
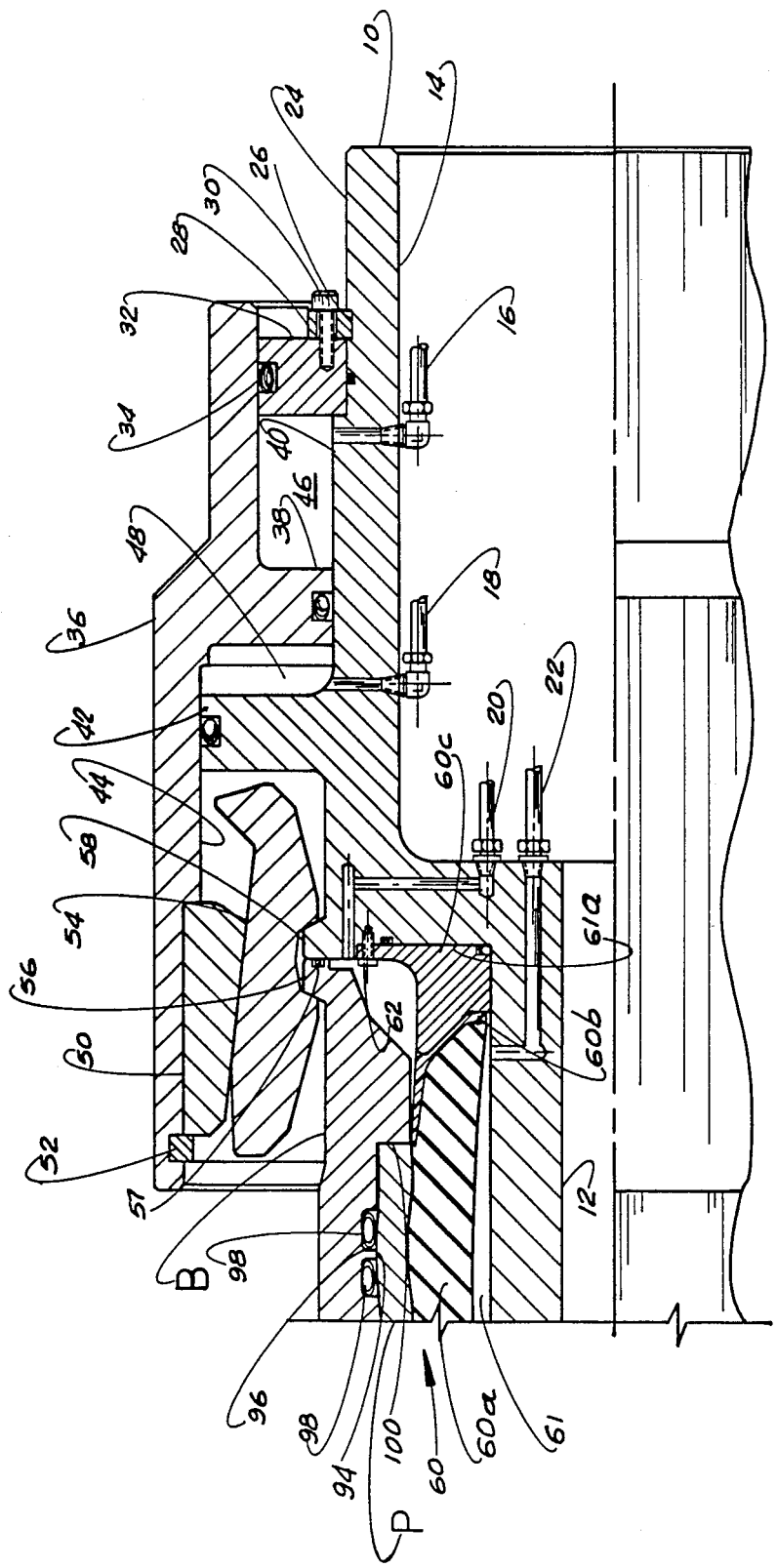
FIGS. 3a and 3b are partial sectional views of the improved apparatus with the resilient sleeve energized and with the pin end of the pipe having been formed into the bell member grooves with FIG. 3a illustrating the right portion of the apparatus and FIG. 3b which illustrating the left hand portion of the apparatus.
Figure 3B:
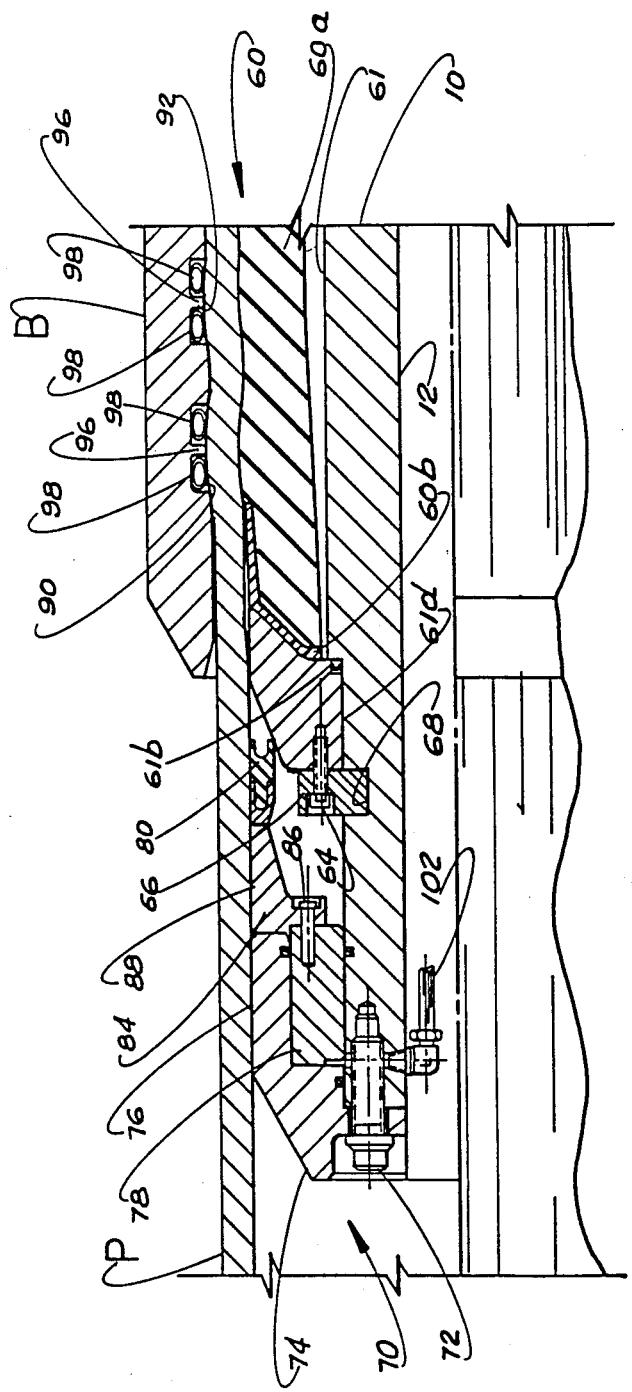

Forging tool F, with locking segments 54 connected to bell B, is inserted into the pin end of pipeline P until the pin end engages shoulder 100 on the interior of bell B. This is the position illustrated in FIGS. 2a and 2b. With forging tool F in this position, hydraulic fluid is delivered through line 22 to the interior of resilient sleeve 60a. When sufficient pressure is developed sleeve 60a is expanded within the pin end of pipeline P and the pin end is expanded or forged into tight sealing engagement with the interior of bell B. This position is illustrated in FIGS. 3a and 3b. It should be noted that sufficient pressure is used so that the pin end of pipeline P is expanded into each double groove and into engagement with lips 96. With this expansion the volume of the grooves 90, 92 and 94 is reduced so that the sealing against the edges of the grooves 90, 92 and 94 and against the central lips 96 would be prevented if water were trapped therein. However, with the improved structure of the present invention, rings 98 compensate for this change in volume by collapsing sufficiently to prevent a pressure build-up in grooves 90, 92 and 94. This volume compensation allows complete sealing without requiring venting the interior of grooves 90, 92 and 94 to the exterior of bell B.

Figure 5:
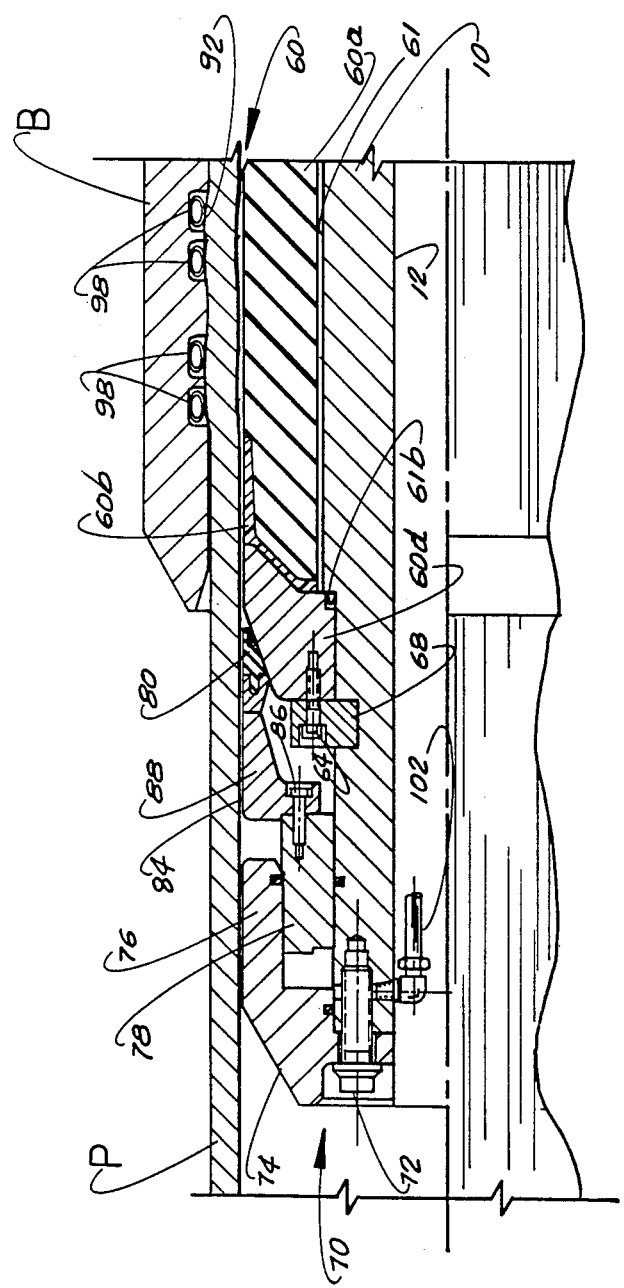
FIG. 5 is a partial sectional view of the improved pipe joint of the present invention being tested with the improved apparatus of the present invention subsequent to the forming of the pin end of the pipe into the bell member grooves.

Further when the forming operation is completed as shown in FIG. 5, hydraulic fluid pressure in line 22 is vented and the testing of the joint is started by introducing hydraulic fluid through line 102 and into the space between ring 74 and annular piston 78. This causes piston 78 to move toward sleeve assembly 60 and forces seal ring 80 into sealing engagement between end ring 60d and the interior of the pin end of pipeline P as shown in FIG. 5. With the test seal assembly 70 set in this manner, test pressure is delivered through line 20 to test the joint. Since flange 56 is sealed against flange 58 by seal ring 57 and forming seal assembly 60 is sealed, any leakage, and the reduction of pressure which would be reflected at the surface, will be the result of leakage through the formed joint between the bell B and the pipeline pin end.

Figure 6:
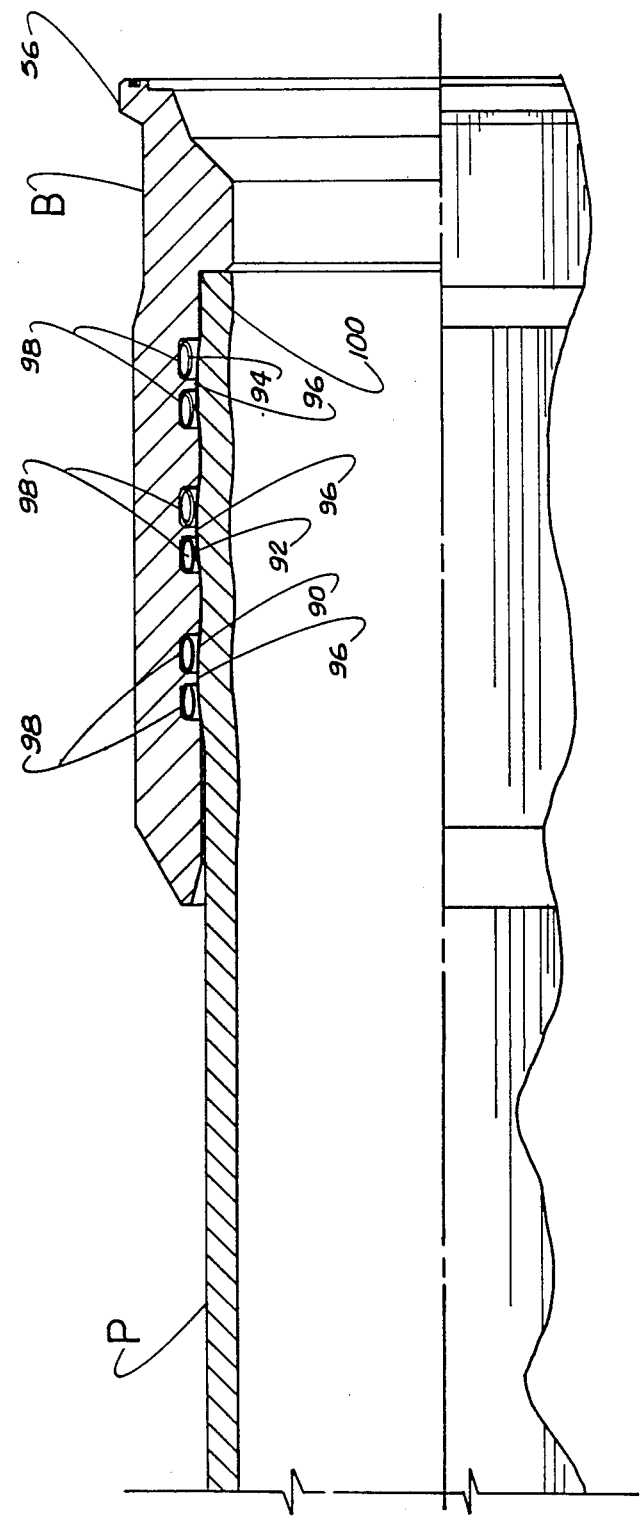
FIG. 6 is a partial sectional view of the improved pipe joint of the present invention after the removal of the forming apparatus therefrom.

The improved joint with forging tool F removed by disconnecting locking segments 54 as shown in FIG. 6 illustrates the joint with the pin end formed into grooves 90, 92 and 94 and against lips 96. Compensating rings 98 have been deformed to compensate for the volume reduction resulting from the deformation of the pin end into the grooves 90, 92 and 94. The joint includes bell B with flange 56 which is suitable for connection by a remotely operated collet connector such as is used to connect tool F thereto.

Figure 7:
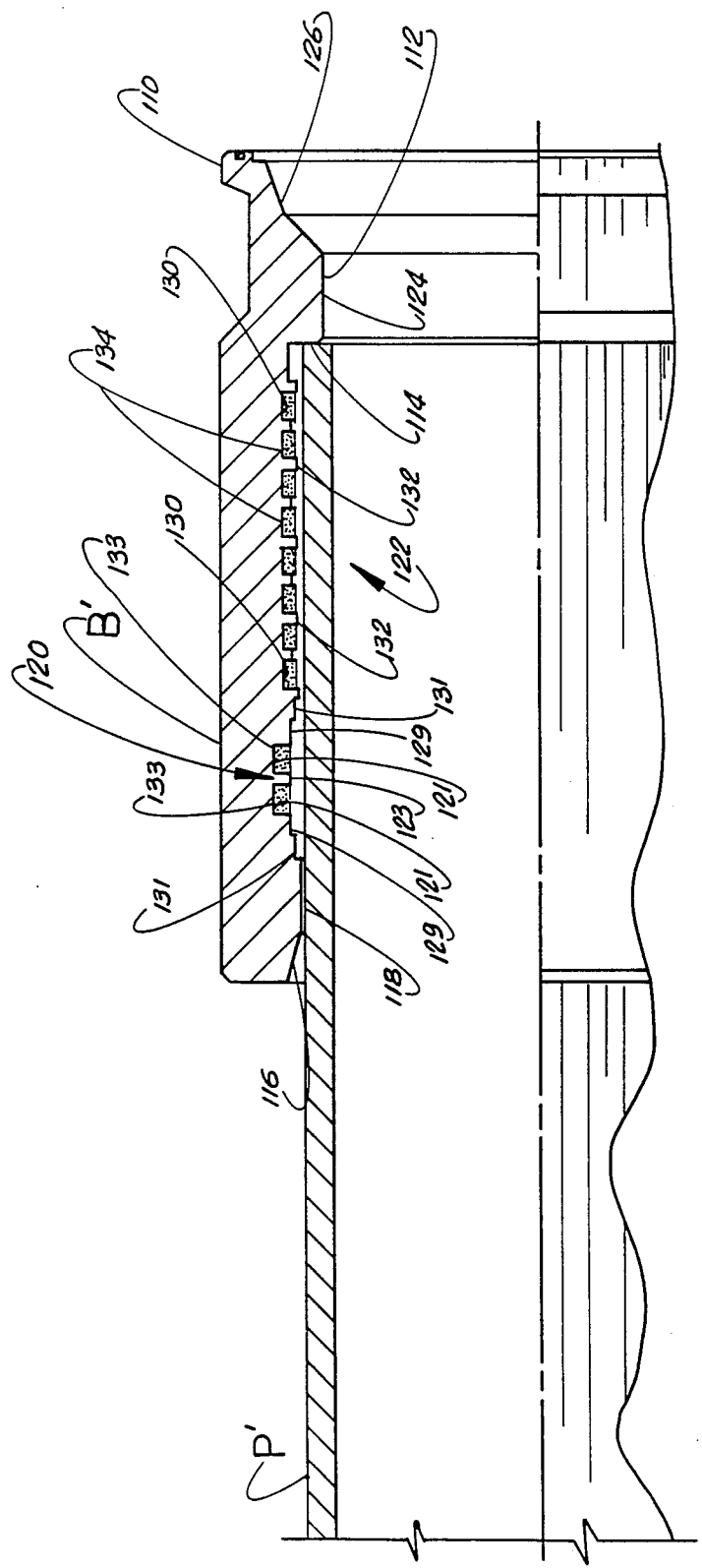
FIG. 7 is a partial sectional view of a modified form of bell and pin end structure of the present invention before forming.

As shown in FIG. 7, modified bell B' includes the generally tubular body having flange 110 at one end and central bore 112. Central bore 112 has shoulder 114 against which pin end P' engages when it is set in position. The other end of central bore 112 includes tapered section 116 which assists the entry of the pin end P', straight section 118 which leads into gripping section 120, sealing section 122, straight section 124 beyond shoulder 114, and section 126 within flange 110, which is adapted to receive a seal for sealing against the adjacent pipe to which the device is connected as hereinbefore explained.

Gripping section 120 includes grooves 121 with rib 123 therebetween and stepped surfaces 129 and 131 on each side of grooves 121. Subsequent forming of pin end P' into gripping section 120 would normally result in an excessive pressure build up in section 120. Volume compensating means 133 is installed in gripping section 120 to ensure that any pressure build up would be below a preselected level. Sealing section 122 includes the plurality of grooves 130 with ribs 132 between each of grooves 130. The sealing section is provided with the compensating means 134 in the grooves 130 so that any water trapped between the exterior of the pin end P' and the interior of sealing section 122 during forming is allowed to displace the volume compensating means and thus not interfere with the forming of pin end P' into sealing engagement with ribs 132. The preferred volume compensating means 133 and 134 in this form of the invention includes a plurality of preselected hollow microspheres in any epoxy matrix. The microspheres are selected so that they will not rupture or collapse under any pressure which is the same as or less than the water pressure at the depth of the water at which the joint is to be assembled and they will collapse at a pressure less than the pressures developed in the forming of the joint to provide the desired volume compensation.

Figure 8:
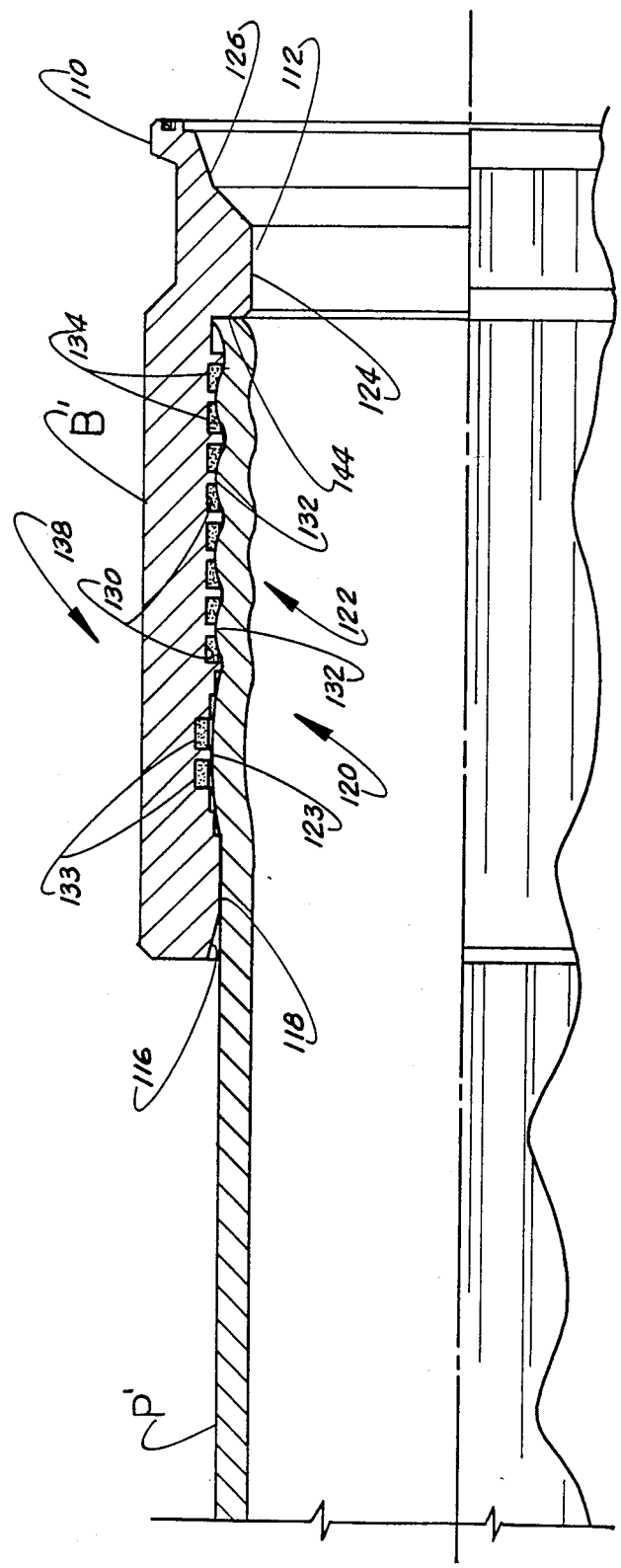
FIG. 8 is a partial sectional view of the pipe joint using the modified form of bell structure shown in FIG. 7.

As shown in FIG. 8, the assembly of pin end P' into bell B' results in modified joint 138 with the inner end of pin end P' being formed into sealing section 122 to tightly engage ribs 132 and portions of volume compensating means 134 have been crushed, as illustrated, to provide the desired volume compensation. Also the portion of pin end P' within gripping section 120 is formed ouwardly into engagement with rib 123 and stepped surfaces 129 and 131 with portions of volume compensating means 133 having been crushed so that pin end P' is sealed within bell B' and also is secured therein to withstand any forces normally expected tending to separate the joint.

Several sources are available for the purchase of the microspheres on the open market, such as "Eccofloat" manufactured by Emerson & Cuming Co. of Canton, Mass. It should be understood that the material, size and strength of such mircospheres is taken into account along with the properties of the matrix in determining a suitable volume compensating means. The crushed pore volume into which the trapped water may flow during forming should be sufficient to prevent a pressure increase between the members which would interfere with the forming of the pin end into the sealing section of the bell. The material in which the microspheres are cast may be varied taking into account that it should not alter the desired end result of providing the volume compensation which allows proper forming of the pin end into the bell so that it will both hold and seal. It is also contemplated that a matrix having bubbles entrapped therein may also be considered for the volume compensating provided the material can be duplicated so that it meets with the characteristics for the volume compensating means of the present invention.

While the microspheres and matrix may be cast into the grooves so that it will be secured in such position when it has set, it is preferred to preform split rings which are deformed and inserted into their grooves.

What is claimed is:

1. The method of joining a first metal tubular member having an internal groove and an external flange to a second metal tubular member having a diameter allowing it to be received within the first tubular member wherein said tubular members are exposed to fluids during joining including the steps of:

introducing a volume compensation means into said groove in said first tubular member prior to insertion of said second tubular member therein, inserting the second tubular member within the first tubular member at the location exposed to fluids with a resilient sleeve of a joining apparatus positioned within the second tubular member, and exerting fluid pressure within said resilient sleeve to cause said second tubular member to be formed outward into said groove in said first tubular member to form a metal to metal sealing joint between said tubular members, said volume compensating means being of such a composition that it displaces liquid which would collect in said groove and collapses under the pressure of the forming of said second tubular member into the groove so that the resistance of the material in the groove does not prevent the forming of the second tubular member therein.

2. The method according to claim 1 wherein introducing a volume compensation means step includes
   positioning a collapsible metal gas filled tube in the groove prior to the step of inserting the second tubular member within said first tubular member.

3. The method according to claim 1 wherein step includes introducing a volume compensation means within said first tubular member.

4. The method according to claim 1 including the step testing the joint between said first and second tubular members to verify that it is fluid tight while said resilient sleeve is still in position within said second tubular member.

* * * * *